UNITED STATES PATENT OFFICE.

ROBERT W. LESLEY, OF PHILADELPHIA, PENNSYLVANIA, ASSIGNOR TO ROBERT W. LESLEY, TRUSTEE, OF SAME PLACE.

MANUFACTURE OF PORTLAND CEMENT.

SPECIFICATION forming part of Letters Patent No. 305,201, dated September 16, 1884.

Application filed February 19, 1884. (No specimens.)

*To all whom it may concern:*

Be it known that I, ROBERT W. LESLEY, of Philadelphia, in the State of Pennsylvania, have invented a certain new and useful Improvement in the Manufacture of Portland Cement, of which the following is a specification.

Portland cement is usually manufactured from chalk and clay or limestones and clay, and contains about thirty per cent. of silica and alumina to about seventy per cent. of lime and magnesia, with varying percentages of iron, potash, soda, sulphuric acid, &c. The manufacture has attained considerable growth in Europe, but has not hitherto been attended with much success in this country, owing to the lack of suitable materials advantageously located.

It is my object to utilize slate in this manufacture. Many of the principal slate deposits in the United States lie within the limits of limestone territory, and by making those deposits available, all the ingredients requisite for the manufacture of Portland cements can thus be obtained within a limited territory, thus obviating one of the most considerable difficulties hitherto experienced by American Portland-cement manufacturers. I can in this way turn to account the accumulations of broken pieces of slate, caused by quarrying operations and faults in the breaking and cleavage of slate in the course of preparation for the market, which accumulations in many instances interfere with and impede the economical working of slate-quarries; and I can also utilize in this way many slate deposits not suitable in a commercial way for roofing-slate, &c.

I have found that slate, while containing many of the chemical ingredients necessary for the production of a Portland cement, is deficient in the amount of lime it contains. By combining with it, however, lime and magnesia in any of their forms, whether hydrates, anhydrous, carbonates, cement rocks, or hydraulic limestones, in such proportions as to bring in the manufactured product the percentage of the lime, or lime and magnesia, up to about seventy per cent., and of the silica and alumina up to about thirty per cent., I have discovered that a cement of excellent quality, having all the characteristics of the best Portland cement, can be obtained.

I here remark that I may in some cases use in conjunction with the slate a small proportion of other silicates or hydrosilicates, taking care to preserve in the compound the relative proportions (hereinbefore given) of the lime, or lime and magnesia, and the silica and alumina. In any event, however, the essential ingredients of the mixture will be lime, or lime and magnesia, in any of their above-stated forms, and slate.

My invention can be carried into effect in various ways, one of which I will now proceed to describe, without, however, meaning to be understood as restricting myself to that special method of procedure.

I take limestones or magnesia-rocks, or both, and, after grinding them up raw, I ascertain by analysis to what extent they are deficient in silica and alumina. I then add to the mass ground slate (the constituent parts of which have preliminarily been ascertained by analysis) in such proportion as to make the manufactured Portland cement analyze about seventy per cent. (say from fifty-five or sixty to seventy-five per cent.) of lime, or lime and magnesia, to about thirty per cent. (say from twenty-five to thirty-five per cent.) of alumina and silica. After the addition and incorporation of the slate the powdered mass is mixed with water, made into bricks or other forms, dried, calcined to a clinker, and then ground into manufactured cement, all of which steps, being well known to those skilled in the art to which my invention pertains, require no detailed description here; or, if desired, the mass may be made into cement in accordance with the process described in Letters Patent No. 292,329, bearing date January 22, 1884.

What I claim herein as new and of my own invention is as follows:

1. The improvement in the art of manufacturing Portland cement, consisting in combining lime, or lime and magnesia, in any of their forms, as stated, and slate, in substantially the proportions specified.

2. The process of manufacturing Portland cement, consisting in combining lime, or lime and magnesia, in any of their forms, as stated, with slate, in substantially the proportions specified, and subsequently calcining said compound to a clinker, and grinding the same, substantially as hereinbefore set forth.

3. The hereinbefore-described product, obtained, essentially, from lime, or lime and magnesia, and slate, taken in the proportions and combined substantially as hereinbefore set forth.

In testimony whereof I have hereunto set my hand this 18th day of February, A. D. 1884.

ROBERT W. LESLEY.

Witnesses:
  EWELL A. DICK,
  WILLIAM H. H. BOWERS.